A. SMITH.
RAILROAD CAR YARD OR TERMINAL.
APPLICATION FILED FEB. 16, 1916.

1,237,963.

Patented Aug. 21, 1917.

INVENTOR
AUGUSTUS SMITH
BY
his ATTORNEYS

UNITED STATES PATENT OFFICE.

AUGUSTUS SMITH, OF ROSELLE, NEW JERSEY, ASSIGNOR TO BERGEN POINT IRON WORKS, OF BAYONNE, NEW JERSEY, A CORPORATION OF NEW JERSEY.

RAILROAD CAR-YARD OR TERMINAL.

1,237,963.  Specification of Letters Patent.  Patented Aug. 21, 1917.

Application filed February 16, 1916. Serial No. 78,693.

*To all whom it may concern:*

Be it known that I, AUGUSTUS SMITH, a citizen of the United States of America, and residing at Roselle, in the county of Union and State of New Jersey, have invented a certain new and useful Improvement in Railroad Car-Yards or Terminals; and the object of my invention is to provide a railroad freight-yard having means for facilitating the sorting out of freight-cars from incoming trains and the making up of outgoing trains to different destinations.

The present yard is especially adapted for use as a marine freight terminal, though it will be understood that the invention is not limited to such use, but may be used inland quite as well if the conditions justify the expense of the construction.

The usual type of railroad freight terminal is a switching or sorting yard consisting of a number of tracks joined together by switches and crossovers and by a ladder track at one or both ends so that incoming trains can be shunted onto any of the tracks in the terminal. From any of the tracks in the terminal any desired car is withdrawn and placed on an outgoing track by breaking the train at the car that is desired to be withdrawn and pulling out the car with the part of the train between it and the locomotive to the ladder track, then switching the car that is to be taken out onto the track where it has to be placed, uncoupling it from the train and then pulling back the rest of the train perhaps to the track in the terminal from which it was taken. This process is repeated for every car that has to be taken out from the trains in which they arrive at the terminal and constitutes one of the great expenses of railroad operation. Besides this, a great deal of real estate is required to provide the necessary track room for the reason that the tracks in the terminal must be about twice as long as the incoming trains so that the latter can be pulled out entirely to get the last car of a train off the incoming track and onto the outgoing track where the car may have to be placed.

The further disadvantage of these present arrangements is, that the terminal is very easily blockaded by the continued arrival of incoming trains if there should be any hitch in getting cars out of the terminal, and once this freight blockade condition exists, the conditions grow rapidly worse, so that the terminal is soon unable to handle any cars whatever because of the operating tracks being blocked by incoming cars.

The object of my invention is to provide a yard of novel construction and arrangement having an overhead crane adapted to lift a car bodily and to transport the same over the tops of other cars standing on tracks alongside so as to place it in any outgoing train that may be desired without disturbing any other car that is not desired to be handled.

This will save locomotive service for the present switching arrangement and will save a great deal of room in the terminal, for the reason that all of the incoming tracks in a terminal commanded by such an overhead crane as I propose to build can be filled solidly with cars, if only the switches are kept open, without interfering with the handling of the cars in the terminal.

In the accompanying drawing.

Figure 1:
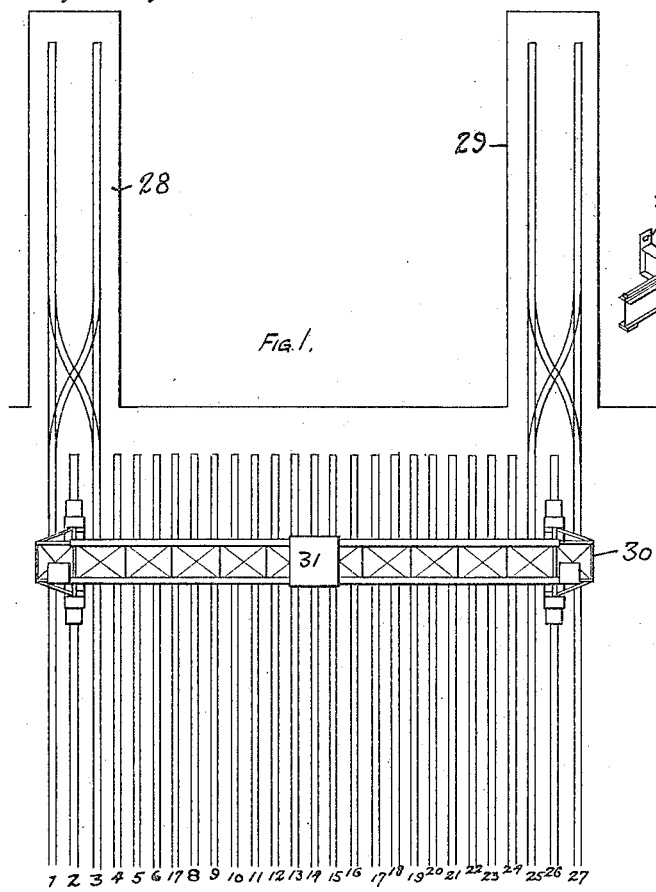
Figure 1 is a schematic plan of a freight yard terminal to which my invention has been applied.

A characteristic terminal arranged in accordance with one embodiment of my invention is shown in Fig. 1, in which tracks 4 to 24 inclusive are supposed to be incoming tracks connected by switches in the usual manner with the main line of the railroad (not shown) and onto these tracks freight trains are backed in by locomotives as they arrive over the line. Tracks 3 and 25 are "palette" tracks, that is tracks on which trains have to be made up out of cars from the incoming tracks to be pushed down onto piers, for instance, shown at 28 and 29, or to go out to some other destination if the terminal is not at the water front. In the case of a water front terminal tracks 1 and 27, or equivalent tracks, would be required to move the empty cars from the piers after the cars had been unloaded onto vessels. Tracks 2 and 26 are the tracks on which the overhead crane 30 itself moves, and these must of necessity be kept free of cars. It is, however, not necessary to limit the "palette"

or making-up tracks to those shown at the ends of the bridge as 3 and 25. Anyone of the tracks from 4 to 24 inclusive could be used for making up a train if it were left clear for that purpose.

Figure 2:
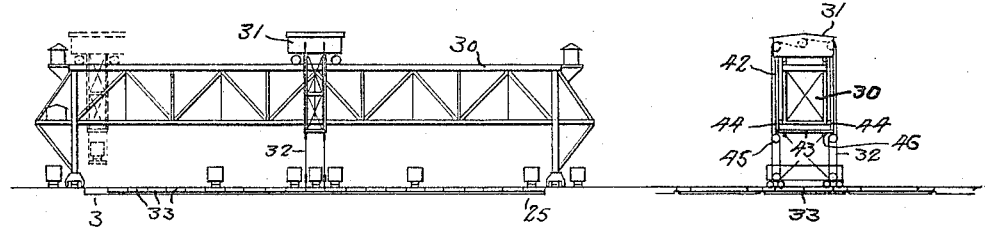
Fig. 2 is a similar cross section therethrough.

Fig. 2 shows a cross section through the yard with the overhead crane or gauntree 30 spanning the trains on the incoming tracks. At the dotted position at the left end of the bridge or gauntree is shown the trolley 31 carrying a car ready to lower same onto palette track 3.

Figure 4:
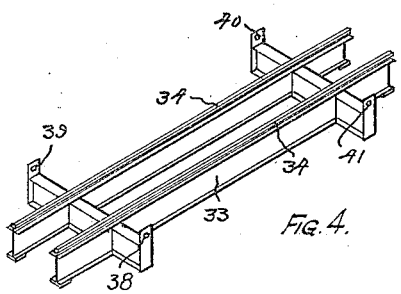
Fig. 4 is a perspective of a track section.
Figure 5:
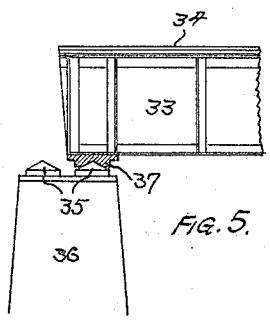
Fig. 5 is an elevation of a centering device for one of the track sections.
Figure 3:
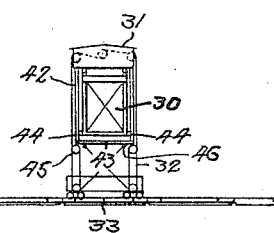
Fig. 3 is a similar cross section through the traveling crane.

Fig. 3 shows an end view or the cross section through the bridge, indicating the position of the hoisting tackles 32 and suggesting the frame or cradle 33 under the car which has to be lifted with it. Fig. 4 shows the cradle 33 in perspective, carrying the rails 34 under the car which has to be lifted by the overhead crane. A cradle of this character is practically a necessity since railroad cars as at present constructed cannot be lifted off the rails readily. Even if some attachment could be devised to put on the cars that are in common use, there would still be the trouble of landing them back on the track where the outgoing train was being made up so accurately that all of the flanges of the wheels would drop on the inside of the rails with accuracy and despatch. In order to handle with safety and despatch any railroad cars as they come, therefore, it is necessary to build all the tracks shown in Fig. 1 under the command of the bridge on the incoming and palette tracks in sections on cradles such as are shown on Fig. 4, each of which can be lifted out bodily with a car on it by means of the overhead crane. In order to have these cradles dropped quickly and accurately in line so as to form a continuous track with the adjacent cradles at either end, some centering device is required at each end of the cradle as shown in Fig. 5 which will center transversely and longitudinally as it is lowered to its exact position. The device suggested for doing this in Fig. 5 is a conical casting 35 bolted to masonry support 36 in the track yard on which a female casting 37 attached to each end of the cradle engages as the latter is lowered into place, thus automatically centering it in both directions as it comes to a bearing. The rails carried by the cradles will thus have an accurate alinement with the rails on the adjacent cradles so that when the cradles are in place the tracks may be used as an ordinary track for train service.

In order to lift the cradles safely in a horizontal plane I propose to make fast at four corners 38, 39, 40, 41, by means of four independent wire rope hoists 32 simultaneously actuated by hoisting machinery (not shown) in the trolley on top of the bridge. The frame 42 of the trolley should preferably be carried down on the sides and connected at 43 under the bridge and have contact against the lower chord of the bridge by rollers or sliding shoes so that motion can be imparted to the hanging cradle with the car on it by the bridge when the latter is started down the yard or when the trolley is started on the bridge with a minimum swinging of the cradle. To further check this swinging of the cradle, it would be advisable to hang the pulley blocks 45 at the lower part of the frame of the trolley, as shown in Fig. 3, while the hauling end of the hoisting rope from the tackle is carried up to the top of the trolley, and at the same time to so reeve the rope that the fixed or anchored end of the hoisting rope is carried to a fastening on the lower part of the frame of the trolley at the opposite side of the bridge from which its top pulley block is hung. Thus, for the rope rove over pulley blocks 45 the anchored or dead end of the rope would be made fast to the frame of the trolley at the point 46 in Fig. 3. The idea of the above is to make the pendulum formed by the cradle a compound one having different lengths so that the vibration will thereby be checked as much as possible. At the same time the angle that the dead end of the rope makes with the vertical will materially check the swinging of the cradle transversely to the axis of the bridge.

The operation of the terminal would be as follows:—

The incoming trains are backed in from the main line on any of the incoming tracks 4 to 24 inclusive and the train is then broken up by separating the cars one from the other at the couplers and air brake pipes, care being taken to place each car on a cradle so that it can be safely lifted by the latter. The cars would then be chocked on the cradles or the brakes set hard to preclude any chance of their running off when the cradles were being handled by the crane. Each palette or make-up track will have one empty space in which there is no cradle.

When the crane is called upon to make up a train of outgoing cars from the incoming tracks the trolley is brought over the car that has to be sent out and lifts it like any crane and transports it to the vacant space in the palette or make-up track into which the car with its cradle is dropped. In order to accomplish this it will of course be understood that all of the cradles are made the same size and are strictly interchangeable. Having deposited the cradle with the car on it in the palette or make-up track the crane moves to the cradle next adjacent at either end of the car that has just been deposited and picks out the empty cradle which is carried back and placed in the incoming track at the point from which the car has just been moved. The crane is then free to pick up any other car at any point in the yard and carry it to the palette or make-up track as before, dropping it in the space which is kept vacant by the procedure above noted.

When the outgoing train is completed on the palette or make-up tracks it is then pushed out by a locomotive before the crane picks out an empty cradle from the make-up track, so that when the made-up train is being pushed out the track is continuous.

The terminal is particularly adapted to freight yards on water fronts where there is little room available and where the terminal is liable to frequent congestion on account of the regularity with which trains arrive and the uncertainty with which the cars are taken away by vessels. The two principal advantages of the terminal are particularly apparent at such a point, namely, economy in real estate and the impossibility of blockading or congesting the terminal so as to interfere with its operation, for the simple reason that when all the incoming tracks are full no more cars can be pushed on them and yet the crane is quite free to take cars out whenever the opportunity arrives to do so.

Various modifications and changes in detail will readily occur to those skilled in the art without departing from what I claim as my invention.

I claim:—

1. A railroad car yard comprising a series of tracks, an overhead crane traveling lengthwise of the yard, and spanning the track series and means on said crane for lifting a car as an entity from one position and carrying it transversely of the yard above the cars therein and depositing it in another portion of the yard.

2. A railroad car yard comprising a series of sectional tracks, an overhead crane traveling lengthwise of the yard and spanning the track series, and means on the crane for lifting a track section with car thereon, carrying the section transversely of the yard above the cars therein and depositing it in another portion of the yard.

3. A railroad car yard comprising a series of sectional tracks, an overhead crane traveling lengthwise of the yard and spanning the track series, and means on the crane for lifting a track section with car thereon, carrying the section transversely of the yard above the cars therein and depositing it in another portion of the yard, together with means for alining said section with adjacent sections to form a continuous trackway.

4. A railroad car yard comprising a series of sectional tracks, an overhead crane traveling lengthwise of the yard and spanning the track series, and means on the crane for lifting a track section with car thereon, carrying the section transversely of the yard above the cars therein and depositing it in another portion of the yard, together with means at the ends of each track section for alining it with adjacent sections to form a continuous trackway.

5. In a railroad car yard, a series of tracks, an overhead crane traveling lengthwise of the yard and having a transversely moving trolley thereon, means on said trolley for lifting a car as an entity from one position in the yard and transferring it to another position in the yard, said trolley having a framework surrounding said crane and bearing against the latter for the purpose of imparting the motion of the trolley readily to the load suspended beneath it.

6. In a railroad car yard, a series of tracks, a crane traveling lengthwise of the yard and spanning the track series, a trolley moving transversely on said crane and having means for lifting a car from one position in the yard and carrying the same to another position in the yard, said means comprising multiple hoists hanging on the framework of the trolley, and means for preventing the hoists from swinging with a pendulum motion, for the purpose specified.

In testimony whereof I have signed my name to this specification, in the presence of two subscribing witnesses.

AUGUSTUS SMITH.

Witnesses:
THOMAS H. ALISON,
JOHN FROHLIN.